June 3, 1941.    G. SLAYTER ET AL    2,244,267
ELECTRIC FURNACE
Filed Jan. 10, 1938    3 Sheets-Sheet 1
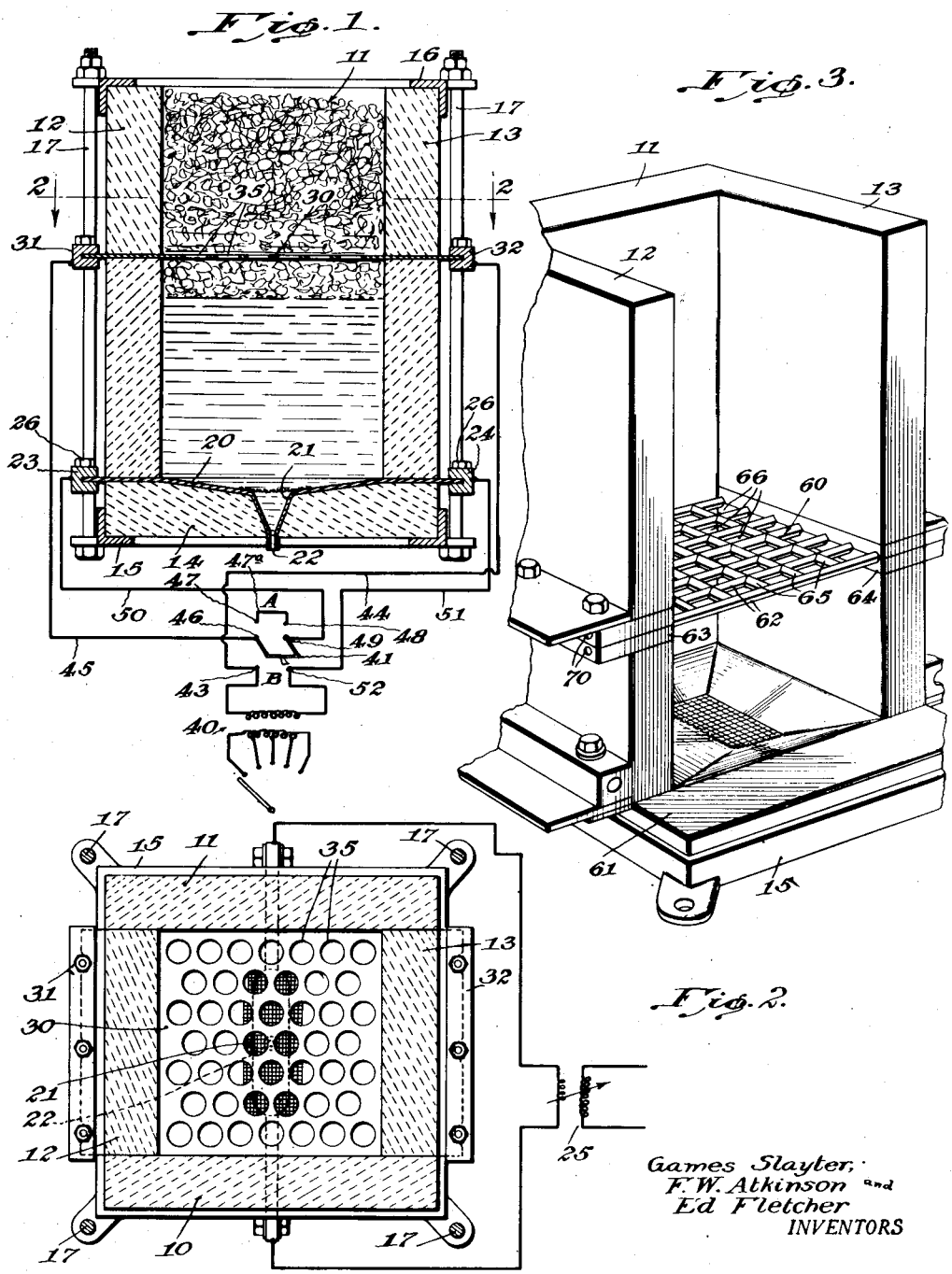
Games Slayter,
F. W. Atkinson and
Ed Fletcher
INVENTORS
BY Rule & Hoge
ATTORNEYS.

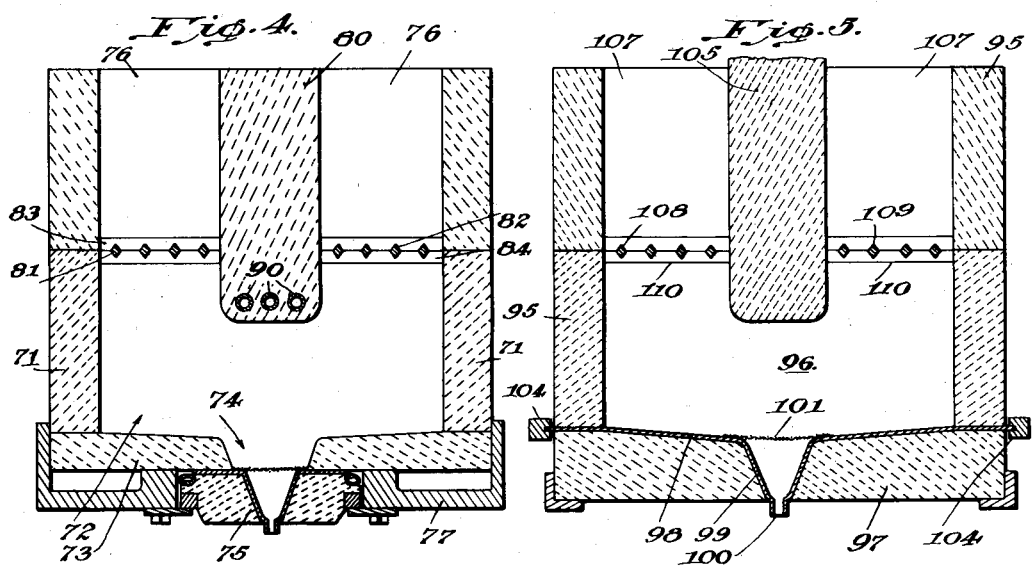
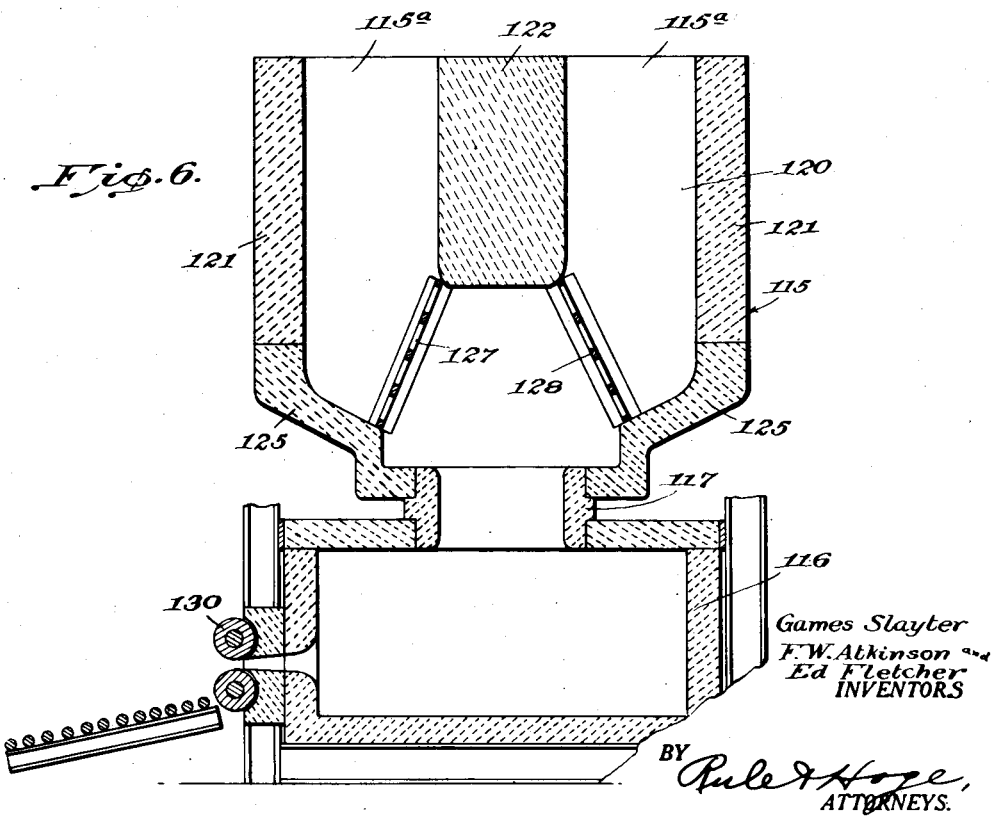

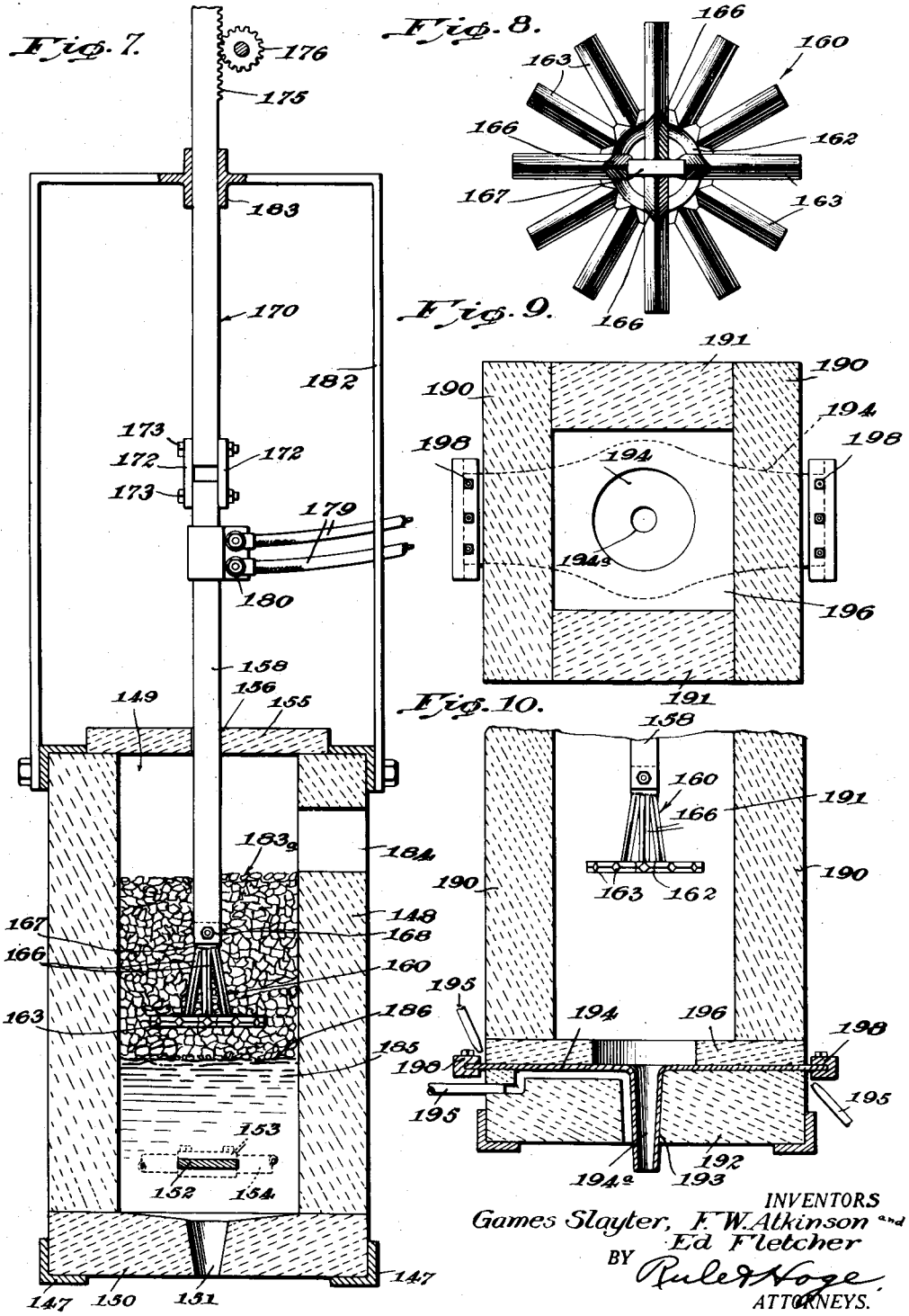

Patented June 3, 1941

2,244,267

UNITED STATES PATENT OFFICE 2,244,267

ELECTRIC FURNACE

Games Slayter, Flavius W. Atkinson, and Ed Fletcher, Newark, Ohio, assignors to Owens-Illinois Glass Company, a corporation of Ohio Application January 10, 1938, Serial No. 184,118

5 Claims. (Cl. 13—6)

The present invention relates to improved methods and apparatus for melting and refining refractory and vitreous materials, silica, glass, ores, metals, and the like, especially those which are melted and fined at high temperatures. The invention is herein particularly described as adapted and used in the melting and fining of metal oxides in silica, as, for example, ordinary glass, but it will be understood that the invention is not limited to such use but comprehends the treatment of various other substances.

An object of the invention is to provide a novel and practical apparatus by which the raw glass batch or the like is melted and fined rapidly and economically, with the expenditure of a comparatively small amount of electrical energy per pound of glass melted, and with a furnace or apparatus which may be small as compared to furnaces of the type now in general use, of equal productive capacity.

Another object of the invention is to produce a clear, bright glass which is free from impurities ordinarily entering the glass from the electrical heating elements or electrodes.

It is another object of the present invention to provide an electrical glass furnace capable of melting the cold batch by means of electricity at the start of the operation without the necessity of preheating the glass by means of gas burners or other apparatus extraneous to the electric melting elements or electrodes of the furnace.

A further object of the present invention is to increase the throughput of the furnace and rate of electrical energy dissipation without fear of burning out or disintegrating the electrodes or causing a discoloration or adulteration of the glass itself.

Another object of the invention is to provide an electric melter which may be made small and compact and yet having an extremely high melting rate without excessive current densities and without a high degree of heat losses due to radiation or conduction to the surrounding atmosphere.

Another object of the invention is to provide a method and apparatus for continuously melting glass batch or the like which enables the electrodes to operate at a very low temperature, so low in fact that the metal or materials from which the electrodes may be chosen may be a very large class including all of the common metals and alloys such as iron, brass, copper, steels, or alloyed steels, besides precious metals such as molybdenum, tungsten, the platinum group metals, including pure platinum, platinum-rhodium, platinum iridium alloys, or the like.

Another object of the present invention is to provide a method and apparatus for melting glass and the like, which involves a positive, self-feeding batch operation, the rate of feed of the batch being automatically equal to the rate of withdrawal of glass from the other end of the furnace.

Another object of one phase of the invention is to impart heat to the glass surrounding the outlet orifice of the furnace. To this end, we have arranged an outlet orifice directly through the electrode.

Another object of one phase of the invention is to provide automatic control means during operation of the furnace. As a means for accomplishing this purpose we have provided electrodes capable of movement toward and away from each other as dictated by the temperature or power input between said electrodes.

Other objects and advantages of the present invention will become apparent from the following description taken in conjunction with the drawings, in which:

Fig. 1 is a cross-sectional elevational view, in part diagrammatic, of an electrical furnace made in accordance with the present invention;

Fig. 2 is a cross-sectional plan view of the furnace shown in Fig. 1, the section being taken along the line 2—2;

Fig. 3 is a fragmentary perspective view of a modified embodiment of the present invention, the front wall of said furnace being removed for the sake of clarity;

Figs. 4 to 7 are diagrammatic elevational views shown in cross-section, illustrating modified embodiments of the present invention;

Fig. 8 is a detailed plan view of an electrode;

Fig. 9 is a cross-sectional plan view of a modified embodiment of the present invention; and Fig. 10 is a fragmentary cross-sectional elevational view of the embodiment shown in Fig. 9.

One of the important features of the present invention concerns an arrangement of at least one of the electrodes to lie in the path of the oncoming raw batch, whereby the raw batch wipes the surface of the electrode and automatically cools it. The electrode is thus maintained in a relatively cold condition in which it does not contaminate the glass or prematurely break down.

To this end, we have discovered that it is desirable to provide an electrode whose surface area is distributed across the path of the oncoming batch in a manner, however, to have the batch wipe across substantially all of the individual portions of the electrode whereby all parts of the electrode are maintained in a cool condition.

We have discovered that by using a permeable electrode in the form of a screen, grill, spider, a multiplicity of spaced apart rods, bars, or the like, it is possible to feed batch through the interstices or openings at an extremely high rate and impart electrical energy to the glass at high voltages without unduly raising the temperature of the electrodes. As a matter of fact, we have found that, in general, the higher the rate of melting used, the lower will be the temperature of the electrodes. The feeding of the batch through the electrodes into the furnace is automatic, uniform and positive, being principally dependent upon the rate of discharge or pull of the glass from the furnace.

We have also discovered that the electrical energy is imparted to the oncoming raw batch by an entirely different method than that due to the use of ordinary electrodes. In normal operation, the body of molten glass does not contact directly with the permeable electrode, but rather it is spaced away a predetermined distance. The voltages required to pass electrical energy from the body of molten glass to the electrode are much higher than ordinary voltages allowable with conventional electrodes. The intervening area is filled with raw batch, bubbles, gases and partially melted materials in a state of great agitation. The mode of dissipating electrical energy within this area largely involves a great multiplicity of constantly quenched arcs of momentary duration. Owing to the fact that the arcs are constantly emerging and re-emerging from new points of departure over the surface of the electrode where they dwell for but a short period of time before being quenched, no parts of the electrode are subjected to the high temperatures accompanying the arcs for a sufficiently long period of time to cause a melting or an attack thereof.

Referring now more particularly to Figs. 1 and 2, reference characters 10 and 11 designate opposite upstanding front and rear walls of a glass tank. Side walls 12 and 13, which are spaced apart from each other, lie interjacent the walls 10 and 11 and are arranged in quadrilateral relation therewith. Other shapes such as circular, hexagonal, or the like, may also be used if desired. A refractory floor 14 provides a bottom for the furnace. The refractory materials may be any conventional type, although, if desired, caked batch may also be used. Metal supporting means 15 and 16 are disposed around the bottom and top of the furnace respectively adapted to form a support therefor, and interconnecting metal rods 17 at each of the four corners of the furnace serve to hold the metal supports 15 and 16 securely together.

Overlying the floor 14 of the furnace and extending outwardly at opposite sides thereof under the side walls 12 and 13 respectively, is a metal electrode 20. In the center of the metal plate 20 may be a trough 21 having an outlet opening 22 at the lower end thereof. The trough 21 and the opening 22 serve as a molten glass feeder and may be independently electrically heated as by means of an independent electric circuit comprising the variable transformer 25 (see Fig. 2), adapted to accurately regulate the final temperature of the glass emerging therefrom. The design of the feeder may be of any suitable type for feeding the glass into molds, a forehearth, revolving pot, upon a rotating mandrel for a tube or cane machine or the like, or other desired fabricating mechanism (not shown).

The opposite ends of the electrode 20 extend outwardly and are received by bifurcated electric terminals 23 and 24 respectively. Bolts 26 serve to clamp the bifurcated ends of the terminals 23 and 24 respectively securely into place.

Arranged in a region between the upper and the lower ends of the furnace walls, is a perforated top electrode 30 extending across the furnace chamber. Opposite ends of the top electrode 30 extend through the walls 12 and 13, and are received by bifurcated electric terminals 31 and 32 respectively. As may be seen more clearly in Fig. 2, the top electrode 30 is replete with holes or openings 35 having any suitable size, as, for example, about three-quarter inch holes, adapted to feed unmelted batch materials therethrough. About half the area of the batch supporting portion of the electrode may be open, if desired, although more or less may also be used.

The electrodes 20 and 30 are hooked up and electrically connected to a suitable source of electrical energy such as a variable transformer 40. Alternating current of any desired frequency may be supplied by said transformer. It has been found, however, that when currents of higher frequencies, e. g., more than 60 cycles and in the neighborhood of several hundred or thousand cycles are used, there is less tendency for momentary oxygen layers to be formed on the faces of the electrodes and consequently less likelihood of oxygen attack on the electrodes is present.

The hookup may be of any suitable type although we have discovered that it is advantageous to provide a selective arrangement whereby the electrodes 20 and 30 may be hooked up either as resistors or as electrodes in series with the intervening glass. In this manner the electrodes may first serve as resistors and supply heat for heating up the cold glass within the furnace at the start of the operation to a point at which the glass is capable of carrying a current therethrough. Then when the glass between the electrodes has become sufficiently molten to permit the current to flow therethrough, the electrical connections may be changed so that the electrodes are placed in series with the intervening glass, so that the melting of the glass is continued by means of heat created within the glass from electrical energy.

A suitable hookup for this purpose includes a double throw switch 41 adapted to be placed selectively in position A or position B to operate the electrodes 20 and 30 as resistors or electrodes respectively.

When in position A the electrical energy passes from the transformer at post 43, and then successively passes over the conductor 44, the terminal 32, the electrode 30, the terminal 31, the conductor 45, the post 46, the post 47, the conductor 47ª, the post 48, the post 49, the conductor 50, the terminal 23, the electrode 20, the terminal 24, the conductor 51, to the post 52 of the variable transformer 40. Thus when the switch 41 is thrown into position A, the electrical current passes through the electrodes 20 and 30 respectively as resistors and heat is imparted to the glass directly therefrom. When starting the glass in this manner, it is advisable to use cullet inside the furnace, as it has been found that a much simpler start may be made in this manner. When the glass has been heated up to suitable temperatures, as, for example, about 1450° F., the switch 41 may be thrown into the position B whereby the electrodes 20 and 30 take on their character as electrodes and impart electrical energy directly into the molten glass.

When the switch 41 is in position B, the electrical energy passes from the post 43, and then simultaneously through conductors 44 and 45 through terminals 31 and 32 into each end of the electrode 30. The electrical energy then passes through the body of glass intervening the electrodes and out simultaneously through opposite ends of the electrode 20 through terminals 23 and 24, through the conductors 50 and 51 to the post 52 of the transformer 40.

During the heating up period at the start of the run, when the switch 41 is in position A, the variable transformer 40 should be adjusted to apply a low voltage as, for example, about one-quarter volt to one volt, according to the size of the furnace. A moderate kilowatt input as, for example, five to fifty kilowatts or more, may be applied to the electrodes 20 and 30 as resistors according to the size of the electrodes and furnace to gradually bring up the temperature to operating conditions.

After the heating up period and the switch 41 has been thrown to position B, the transformer 40 may be adjusted to provide a much higher voltage to the electrodes 20 and 30. Voltages ranging as high as several hundred volts, more or less, may be applied, although care should be taken to see that the voltage should not be high unless the pull on the furnace is also high in order to permit cold batch to feed through and cool the electrodes. That is to say, the voltages between the electrodes 20 and 30 should be adjusted to the pull of glass on the tank although this facilitates a wide and flexible range of operation.

After the furnace has been pulled for a period of time, the level of the molten body of glass lowers away from the permeable electrode and remains spaced away therefrom during normal operation. Several inches may separate the electrode and the molten glass level. Voltages may be used commensurate with the distance maintained between the molten body and the electrode.

During the melting, a violent reaction caused by incipient sparking which is damped by the oncoming batch occurs between the surface of the molten glass and the permeable electrode. The melting in this region is also accompanied by a rapid escape of gases which is sufficiently exercised in the melting region that a uniform and positive feeding of the glass batch through the permeable electrode is assured. The evolved gases then merely pass upwardly through the batch where they are discharged.

In this connection, the glass is not only melted when it reaches the molten body, but is also fined, and the glass which passes out through the outlet 22 is in a very clear, molten and refined condition. The present invention permits extremely high voltages to be used whereby current densities may be relatively low and below dangerous maximums.

The passage of the cold batch material through the openings 35 in the top electrode actually reduces the temperature of the electrode to very low temperatures as, for example, 1000° F. to 2300° F. Experience has shown that in general the higher the rates of melting, the lower is the temperature of the top electrode 30.

Moreover, the higher the rates of melting, the better are the efficiencies. At slow rates of melting, there appears to be a greater heat loss through the side walls of the furnace, but as the rates of melting are increased, the temperatures of the walls appear to decrease and the efficiencies rise, so that efficiencies as high as three or four, and even more pounds of ordinary glass per kilowatt hour, are possible.

Referring now more particularly to Fig. 3, a slightly modified embodiment of the present invention is disclosed. The design of this furnace may be similar to that shown in Figs. 1 and 2, and accordingly only the major differences will be pointed out.

The furnace comprises as before a top electrode 60 and a bottom electrode plate 61. The top electrode is composed of a grillwork comprising a series of longitudinal bars 62 extending from side to side and fitting in the terminals 63 and 64 at opposite ends of the furnace respectively. The grill 60 may also include a series of transverse bars 65 forming a network replete with openings 66 through which the glass batch may flow. In order to increase the surface area of the bars 62 and 65, facing downwardly we have provided bars having a diamond-shaped cross-section with the points of the diamond extending downwardly. In this manner the passage of batch through the openings 66 is also facilitated, and no flat surfaces are present at the top of the grill upon which glass batch may be retained.

The bars 62 fit into and are held in position by means of terminals 63 and 64 at opposite sides of the furnace which may be flush with the inner surface of their respective walls. These are provided, if desired, with suitable cooling means 70 to prevent premature melting out upon a sudden or inadvertent heat surge which would raise the temperature above the melting temperature of the terminals 63 and 64, especially when the latter are composed of copper or the like. Cooling means 70 may consist of channels adapted to provide cooling water into the interior of the terminals.

Referring now more particularly to Fig. 4, we have disclosed an apparatus in which each of the electrodes is of the perforated type and glass batch may be fed through each of them simultaneously in order to keep them in a cooled condition. While only two electrodes have been illustrated, any number may be used in similar arrangement, and if, say, three are used, they may be interconnected with three-phase current.

The furnace comprises upstanding side walls 71 spaced opposite one another, and front and rear walls 72 arranged in quadrilateral relationship. A floor 73 having an outlet opening 74 covers the bottom of the furnace. A metal frame or pan 77 serves as a support for the floor 73 and the furnace. A suitable feeder 75 may be provided of any desired type. Dividing the upper portion of the furnace into two individual passages 76 for feeding incoming batch, is an intermediate wall 80 extending part way down into the furnace to the melting zone.

Mounted across each said passage 76, on each side of the intermediate wall 80, are perforated electrodes 81 and 82 respectively. These are each provided with electric terminals 83 and 84 respectively mounted in the front front and rear walls 72 in a manner similar to that illustrated more fully in connection with Fig. 3.

In operation of this device, the electrodes 81 and 82 are electrically connected to a suitable electric current source such as a transformer (not shown), and electrical energy is passed through the melting zone between the electrodes.

In operation of this furnace, fresh batch is fed simultaneously through each of the electrodes 81 and 82 whereby they are cooled to very low temperatures. If desired, a different ingredient of the batch may be fed through each electrode. As the glass batch passes through the openings of the electrodes, it immediately comes under the influence of the electrical current passing between the electrodes and is caused to melt and form the glass. Water cooling means 90 may be provided in the intermediate wall 80 in order to prevent premature wearing away of the refractory walls. If desired, the wall 80 may be composed of cakes of batch having the same composition as that of the glass itself so that any heating and melting of the wall 80 will not change the composition of the glass itself. This cake may then be fed gradually into the furnace.

In Fig. 5 we have illustrated another embodiment of the present invention in which three-phase electrical current may be used. The furnace consists of oppositely disposed side walls 95 and front and rear walls 96 spaced in quadrilateral arrangement with the side walls 95. A floor 97 of the furnace is provided with a lining 98 of sheet metal adapted to form an electrode. A suitable trough 99 may be integrally united with the electrode 98 to provide feeding means through the outlet 100 at the bottom thereof. A screen 101 may be provided over the feeding trough 99 in order to prevent stones, unmelted batch, or other foreign matter from passing through the outlet 100. At each end of the electrode 98 may be provided terminals 104. Dividing the upper portion of the furnace in two parts, each providing a passage 107, is an intermediate wall 105 which is mounted in and extends transversely of the front and rear walls 96. The lower end of the wall 105 terminates at the upper portion of the melting zone. The wall 105 may be similar in design to the wall 80 of Fig. 4 or it may be composed of caked batch which is gradually fed down into the melting zone as it is consumed.

Perforated electrodes 108 and 109 may be arranged across the respective passages 107 in a manner similar to that shown in Fig. 4 and water cooled terminals 110 may be provided for each of the electrodes 108 and 109.

Various electrical hookups may be used with this furnace. If desired, single phase current may be used, in which case electrodes 108 and 109 are each electrically connected to one pole and electrode 98 is electrically connected to the opposite pole. If desired, however, three-phase current may be used, in which case electrodes 108, 109 and 98 are each electrically connected to an individual phase, and the electrical current will pass through the glass intermediate the three electrodes.

In operation, the batch is fed down from the top of the furnace through the perforations in the electrodes 108 and 109, is melted into glass within the melting zone intermediate the three electrodes, and then passes out through the outlet 100.

In Fig. 6 another embodiment of the present invention is illustrated. This furnace consists of an upper melting chamber 115 and a lower refining chamber 116, connected by a throat 117. The upper chamber serves as a melter and the lower chamber serves primarily as a refining and storage chamber. Other feeders and outlets, however, may also be provided for this furnace in place of the throat 117 and the refining chamber 116, as, for example, the feeders illustrated in Figs. 1 to 5, or other suitable feeders.

The upper chamber or melter 115 comprises front and rear walls 120 and side walls 121 spaced in quadrilateral arrangement. Other arrangements such as circular or octagonal, may also be used if desired. Dividing the upper portion of the chamber 115 into two passages 115ᵃ is an intermediate wall 122 extending down to the melting zone. The lower portion of the chamber 115 is defined by converging side walls 125 terminating at their lower end in the throat 117. Connecting the converging side walls 125 and the intermediate wall 122 on each side of the furnace are perforated electrodes 127 and 128 respectively. Here again the perforated electrodes 127 and 128 lie across the path of the oncoming batch which is fed down from the top on each side of the furnace.

In operation of this device, an electrical alternating current is passed between the electrodes 127 and 128 and passes through the glass batch and glass lying therebetween, to cause a heating and melting thereof. The melted glass intermediate the electrodes then passes down through the throat 117 into the refining chamber 116, from where it may pass into any desired fabrication project as, for example, the plate glass-forming apparatus 130. As the glass batch passes through each of the electrodes 127 and 128, it is of very low temperature and accordingly continually wipes the heat from the electrodes and maintains them at a very cool temperature. The gases evolved from the furnace may pass up through the perforations of the electrodes and pass out through the batch.

Referring more particularly to Fig. 7, the furnace comprises upstanding side walls 148 and end walls 149 arranged quadrilaterally with respect to one another, and a floor 150 having an outlet opening 151 therethrough. A metal framework 147 supports the structure.

Arranged in proximity to the outlet 151 and supported by the end walls 149, is an electrode 152. This electrode 152 may extend across the furnace chamber in the flow of molten glass, and be supported at opposite ends by means of the terminals 153. Water cooling means 154 may be provided in conjunction with the terminals 153.

Overlying the furnace walls 148 and 149 may be a cover plate 155 having an opening 156 therein adapted to admit a supporting rod 158 into the melting chamber. The rod 158 has an electrode 160 at its lower end and admits electrical energy to it.

The top electrode 160 is preferably of the permeable or perforated type having its surface areas distributed in such a manner that the glass batch may wipe across substantially all portions of its surface in order to cool it. As shown more completely in Fig. 8, the top electrode 160 may comprise an open ring 162 arranged horizontally and having a plurality of radially extending fingers 163 integrally united to said ring. The ring may be supported by a plurality of ribs 166, united at their lower ends to ring 162 and at their upper ends to a lug 167 which is secured to a terminal 168 on the rod 158.

The upper end of the rod 158 may be held by means of a reciprocal arm 170, secured to the rod 158 by suitable insulating connectors 172. These insulating connectors 172 may be composed of a glass, porcelain or other high resistant material, and may be secured to the support and arm, respectively, by means of bolts 173.

The reciprocating arm 170 may be provided with a rack 175 and pinion 176 at the upper end thereof adapted to adjust the top electrode system to any predetermined distance from the electrode 152. Flexible power leads 179 may make electrical connection with the rod 168 through a suitable connection 180. A frame 182 may be secured to the top of the furnace and have a bearing and guide 183 at the upper end thereof adapted to provide bearing support for the reciprocating arm 170. The batch 183ᵃ may be fed into the interior of the furnace chamber through any suitable opening such as the opening 184 in one of the side walls 148. This batch is gradually fed downwardly past the electrode 160 to the body of molten glass 185 having a glass level 186 under normal operation spaced below the electrode 160.

The operation of this device is similar to that illustrated and described in Figs. 1 to 3, with the exception that the top electrode 160 may be lowered or raised to any predetermined distance from the bottom electrode 152 or the glass level 186. Thus under normal operation, at a particular pull on the furnace, the top electrode would be maintained a particular optimum distance from the electrode 152. A uniform voltage may be applied between the electrodes, if desired, and a predetermined distance would be maintained between the top electrode and the glass level 186. The exact distance between the top electrode and the glass level 186 would be determined by the voltage applied between the electrodes, the higher the available voltage, the greater the distance may be between the upper surface of the body of glass and the top electrode. If, however, the distance between the upper surface of the body of glass and the top electrode 160 should become diminished as, for example, by a lowering of the pull, the pinion 176 may be operated automatically by means of a suitable reversible motor (not shown) to raise the top electrode until the power input reached the predetermined norm.

On the other hand, if the level fell away from the top electrode 160, the pinion 176 may be operated to lower the electrode 160 to the point where the power input again reaches the predetermined norm. The distance then between the two electrodes 160 and 152 may be regulated to maintain a constant power input to the furnace. Of course, if the pull were to be permanently changed, the normal power input would also be changed, which in turn would change the standard distance between electrode 160 and glass level 186.

If a constant voltage were to be applied, the distance may be regulated in accordance with the amperage. If desired, however, the distance may also be regulated by the temperature of the glass.

In Figs. 9 and 10, an embodiment of the present invention has been shown which is similar to that illustrated in Figs. 7 and 8, with the exception of the bottom electrode. Accordingly, parts which are similar to those illustrated in Figs. 7 and 8 will be labeled with like numbers in Figs. 9 and 10.

The furnace comprises the upstanding side walls 190 and the end walls 191 arranged in quadrilateral relationship, and a floor 192 having an opening 193. Overlying the floor 192 is an electrode 194 having a feeder outlet 194ᵃ fitting in the opening 193. The electrode 194 is composed, as may be the other electrodes mentioned herein, of any suitable material such as platinum, carbon, iron, tungsten, or molybdenum. Tungsten and molybdenum are both suitable for use with molten glass or silica at high temperatures, and when completely surrounded by glass, will not react with any of the glass making oxides commonly in use. However, where used with only one surface in contact with the glass, the rear surface must be protected against an oxidizing atmosphere and thus should be protected by a reducing atmosphere. Accordingly, a hydrogen or hydrocarbon atmosphere may be provided at the back side of the electrode 194 by means of supply conduits 195. If desired, a highly refractory block 196 may be provided overlying the outer circumference of the electrode 194 exposing, however, a sufficient portion of the electrode 194 to the molten body. Such a block may be fabricated out of Corhart, beta alumina refractories, or the like. Suitable terminals 198 may be provided in each end of the electrode 194.

Various modifications and variations may be resorted to within the spirit and scope of the present invention as defined in the appended claims.

We claim:

1. In a method of heating and melting glass in an electric furnace in which the mass of molten glass serves as a resistor to an electric current flowing between spaced cooperative electrodes, one of which is perforated with a multiplicity of openings therethrough, the step of feeding cold glass batch consisting of electrically nonconducting materials in disintegrated form through the said openings and thereby wiping the heat from said perforated electrode, maintaining a layer of the said nonconducting materials between said perforated electrode and the molten glass, and applying very high voltages between said electrodes whereby incipient sparking is induced within said layer and the incoming batch quenches said sparks as it passes through said electrodes.

2. The method of melting and fining glass which comprises establishing a mass of glass-forming materials, feeding electrically nonconducting cold unmelted batch of such materials in fragmental form continually into said mass, and imparting an electrical current at high voltage into said mass from a region at which said cold glass batch is unmelted and is being fed into said mass, and thereby permitting said glass in said region to remain relatively cool.

3. An apparatus for melting and fining glass which comprises a melting chamber of refractory materials having upstanding side walls and a floor, a perforated electrode extending entirely across said chamber having openings therein through which unmelted batch may be fed from the upper portion of said chamber, and a second electrode of sheet metal overlying said floor, said floor having an outlet opening therethrough adapted to emit molten glass at a predetermined rate, said sheet metal being perforated and extended downward at the outlet opening and forming a lining for the refractory walls of the floor outlet opening.

4. The method of melting and fining glass, which comprises establishing a body of molten glass capable of conveying electric current, feeding a conglomeration of electrically nonconducting raw batch materials in fragmental or powdered form into said body of molten glass, and transmitting electrical energy at a high voltage to said raw batch materials from an electrode within a zone separated from the molten glass by the raw batch materials and thereby causing the electrical energy to be transmitted to and through the molten mass from said raw batch while maintaining the electrode in a cooling zone separated from the molten glass.

5. The method of melting and fining glassmaking material which comprises establishing a body of molten glass, providing a flow of electrically nonconducting raw batch material in pulverized or fragmental form to said body of molten glass, creating a high voltage differential between said molten body and a region within the path of flow of said raw batch material, said region being spaced away from said body, and thereby creating arcing in the interstitial spaces within the batch material which is flowing intermediate said region and the body of molten glass, with the flow of oncoming batch serving to quench said arcs and being melted and then passing into and becoming part of said molten body.

GAMES SLAYTER.
FLAVIUS W. ATKINSON.
ED FLETCHER.